L. B. BALL.
Improvement in Horse Hay Rakes.
No. 124,110. Patented Feb. 27, 1872.
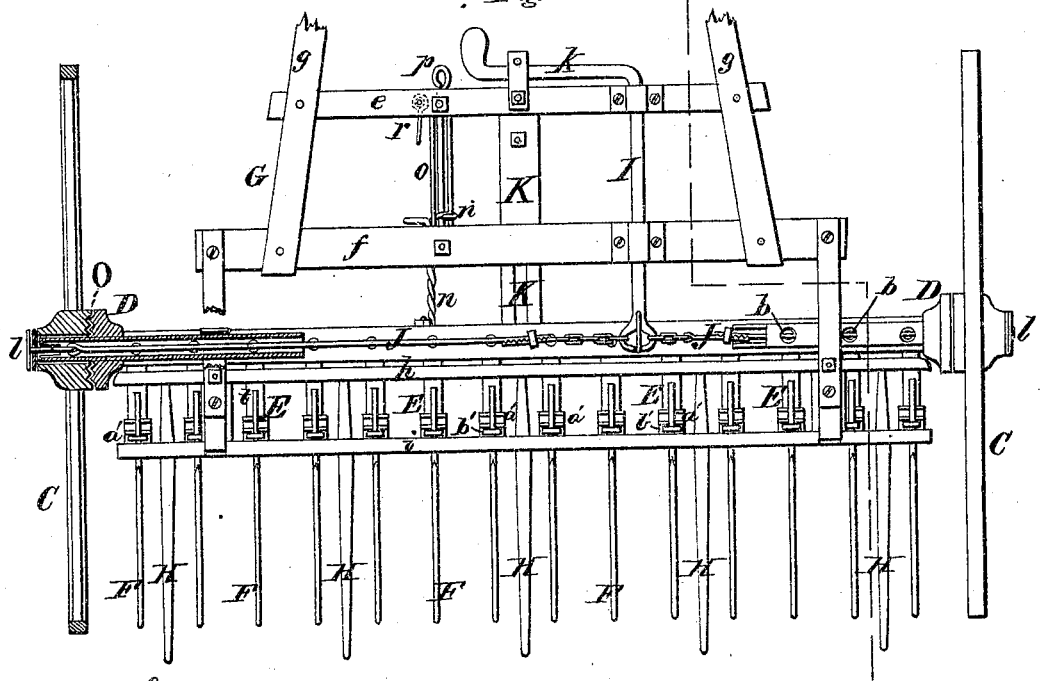
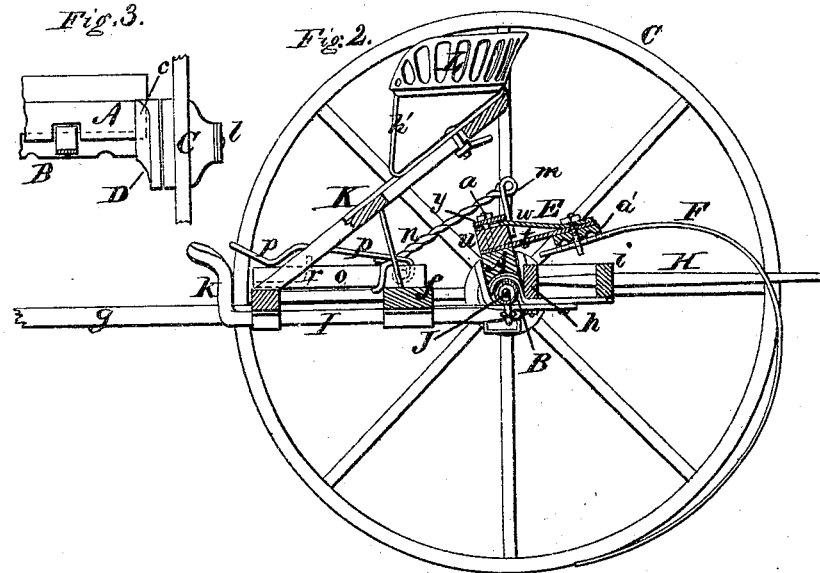
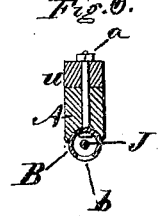
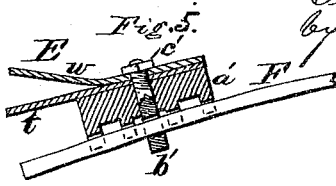
Witnesses.
Harry King.
Phil T. Dodge.
Inventor.
Levi B. Ball.
by Dodge & Munn,
Attys.

124,110

UNITED STATES PATENT OFFICE.

LEVI B. BALL, OF DAYTON, OHIO.

IMPROVEMENT IN HORSE HAY-RAKES.

Specification forming part of Letters Patent No. 124,110, dated February 27, 1872.

SPECIFICATION.

*To all whom it may concern:*

Be it known that I, LEVI B. BALL, of Dayton, in the county of Montgomery and State of Ohio, have invented certain Improvements in Horse Hay-Rakes, of which the following is a specification, reference being had to the accompanying drawing.

My invention relates to that class of wheeled spring-tooth rakes in which the teeth are raised by means of the wheels; and it consists in a novel manner of constructing the rake as a whole; in a novel manner of attaching the teeth; and in other details, as hereinafter described.

Figure 1 is a bottom-plan view of my rake; Fig. 2, a vertical section of the same, on the line $x\ x$ of Fig. 1; Fig. 3, a rear view of one end of the axle and its wheel; and Figs. 4, 5, and 6, views of various details and modifications.

In constructing my rake, I first provide a long wooden axle, A, and to the under side of the same, at each end, secure a tube or pipe, B, allowing said tubes to extend beyond the ends of the axle, so as to form shafts or journals for the main wheels C, which I mount loosely thereon, as shown. The tubes or journals B, I set slightly into the wooden axle A, as shown, and secure them thereto by vertical bolts $a$, as shown in Fig. 6. The tubes being provided in their lower side with holes $b$, which are large enough to admit the heads of the bolts, and in their upper side with smaller holes which admit only the stems or bodies of the bolts, the heads of which bear against the inside of the tubes and hold them in place. On each of the tubes or journals B, I mount a disk or plate, D, provided with flanges $c$ fitting over the end of the wooden axle A, so as to prevent the disks from turning on the tubes. The outer faces of the disks D and the inner ends of the wheel-hubs, I provide with annular V-shaped grooves $o$, as shown in Fig. 1, so that when the wheels are forced inward, the grooved ends of their hubs will fit against the disks D with sufficient friction to turn them and the axle A forward with the wheels. To the axle A, I secure a series of arms or brackets, E, carrying the rake-teeth F, so that when the axle A is turned forward by the wheels the teeth will be thrown up. To the journals or tubes B, I suspend the frame G of the rake, consisting of two front cross-bars, $e$ and $f$, having the thills $g$ attached, and two rear cross-bars, $h$ and $i$, provided with the clearer-arms H for removing the hay from the rake-teeth when the latter are raised. The frame thus suspended serves as a means by which to draw the axle with its wheels and rake-teeth about, and permits the axle to be turned so as to raise the teeth while the frame with its clearer-arms remains stationary. Under the front of the frame I mount a longitudinal rock-shaft, I, provided at its front end with a right-angled arm or lever, $k$, and having its rear end forked or provided with two arms. To the rear arms of this rock-shaft I connect the ends of two rods, J, and then pass one of said rods out through each of the hollow journals or tubes B, and provide them on their outer ends with heads or plates $l$ bearing against the outer ends of the wheel-hubs, as shown, so that when the rock-shaft is turned, by bearing on its arm $k$ its rear arms draw the rods J inward, so that their heads $l$ force the wheels up against the disks D, and cause them to turn the axle and raise the teeth, as before described. To the axle A, I attach an upright arm, $m$, and to this arm pivot one end of a rod, $n$, the front end of which is mounted, so as to slide on a bar, $o$, secured on the front of the frame. To the bar $o$ I pivot a foot-lever, $p$, bearing on the sliding end of rod $n$, so that by bearing on the lever $p$ the rod $n$ may be held at any point or its movement controlled, and thus the teeth held down to their work or lowered gently after having been raised. The front end of the lever $p$ I bend downward, as shown in Fig. 2, so that in case the teeth do not fall when the wheels are released from the disks, pressure on the lever will cause its inclined end to push back the rod $n$ and thus start the axle and teeth backward. I also attach to the front of the frame a hook, $r$, by which the rod $n$ may be fastened forward so as to hold the teeth up. On the front of the frame is mounted an inclined slotted bar, K, and on this bar is mounted a triangular frame or block, $h'$, supporting the driver's seat L. The frame or block is provided with a bolt, which passes through the slotted bar and has a thumb-nut on its end, so that the seat may be adjusted up or down, and fastened at any required point by tightening up the thumb-nut.

In operating my rake, the driver sits upon his seat and keeps one foot on the lever $p$, so as to hold the teeth down to their work. When the teeth are filled with hay, he removes his foot from lever $p$ and bears it upon the arm $k$ of the rock-shaft, by which the wheels are forced against the disks and caused to raise the rake-teeth. As the teeth rise the clearer-arms, remaining stationary, remove the hay from them. The driver then removes his foot from the arm $k$ of the rock-shaft so as to release the teeth, and then bears on the lever $p$ so as to let the teeth down gradually. The brackets E by which the teeth are carried, each consist of a flat steel spring, $t$, having its forward end secured between the top of the axle A, and a strip, $u$, secured thereon, and of a brace, $w$, having its rear end secured to the end of the spring $t$, and its forward end slotted and mounted on top of the strip $u$, as shown in Fig. 2. A metal cap or block, $y$, is placed over the slotted end of the brace $w$, and a bolt, $a$, passed through the cap, the slotted end of the brace, the strip $u$, the spring $t$, and the axle A, so as to hold them all together. The same bolts which hold the brackets at the ends of the axle A also hold the hollow journals B in place. Under the outer end of each arm or bracket, I place a metal block, $a'$, of the form shown, to serve as a seat or bearing for the tooth, and through said block and the spring and brace, I pass the stem of an eye-bolt, $b'$, and apply a nut, $c'$, to its end, and then insert the end of the tooth through the eye and tighten up the nut so as to draw the tooth up against the block, and hold the block, spring, and brace all firmly together. The arm or bracket thus arranged, yields and permits the tooth to rise when it meets any obstruction, but the brace at the same time prevents the spring from being bent so much as to endanger breaking it. Instead of having the rod $n$ slide on the bar $o$ attached to the frame, it may be arranged to slide on the foot-lever $p$, as shown in Fig. 4, in which case the front end of the lever is arranged to work between two inclined arms $e'$, which serve to push the rod backward and start the teeth downward, in the same manner as the inclined end of the foot-lever in Fig. 2, the rod $o$ in this case extending all or only a part of the way across. It is also obvious that instead of providing the rods J with heads to bear against the outer ends of the wheel-hubs, the hollow journals or tubes may be extended beyond the wheels, and sleeves mounted on them to bear against the hubs, and then the sleeves connected with the rods so as to be drawn inward by them against the wheels. The rods J may be operated by any suitable device, although the rock-shaft is considered the best.

Having thus described my invention, what I claim, is—

1. In combination, with the axle A, having the rake-teeth attached, and provided with the hollow journals B and disks D, I claim the wheels C and rods J, when arranged to operate as set forth.

2. A yielding arm or bracket, E, for carrying a rake-tooth, consisting of the spring $t$ and brace $w$, when constructed and arranged to operate as described.

3. The combination of the tipping-axle having the teeth attached, with the sliding rod $n$, bar $o$, and foot-lever $p$, all constructed and arranged to operate substantially as described.

LEVI B. BALL.

Witnesses:
MORRISON PARKER,
FREDERICK B. SHULL.